United States Patent Office 3,641,182
Patented Feb. 8, 1972

3,641,182
HIGHLY CALCINED SUPPORT FOR CATALYTIC DEHYDROGENATION
E. O. Box, Jr., and David A. Uhrick, Bartlesville, Okla., assignors to Phillips Petroleum Company
No Drawing. Filed May 28, 1969, Ser. No. 828,777
Int. Cl. C07c 5/18
U.S. Cl. 260—680 R
15 Claims

ABSTRACT OF THE DISCLOSURE

Alkanes, cycloalkanes, arylalkanes, and particularly n-butane diluted with steam, are dehydrogenated in the absence of free $O_2$ at high conversion and selectivity to less saturated compounds with a novel highly calcined catalyst support such as alumina, silica, or a Group II aluminate spinel impregnated with a material selected from the group consisting of one or more Group VIII metals, a Group Ia metal, and a tin group metal and mixtures thereof.

The invention relates to an improved process for the dehydrogenation of dehydrogenatable hydrocarbons wherein catalytic materials are supported on a highly calcined support. In another aspect the invention relates to a process of making the highly calcined support.

It is conventional in the dehydrogenation of paraffin hydrocarbons to utilize catalysts such as nickel-kieselguhr, chromium oxide-alumina, zinc oxide-alumina, platinum-alumina, and the like. In general, prior art processes are operated with a water-free feedstock and at a low pressure. Considerable advantages are inherent in any process that can operate with steam, for instance, heat of reaction can readily be supplied, coke deposition on the catalyst can be retarded, and expensive compression of products can be avoided since elevated pressures can be employed and steam can readily be condensed after dehydrogenation is effected. For reasons such as these, various attempts have been made to employ steam in processes for the dehydrogenation of paraffin hydrocarbons.

We have now found that highly active and exceptionally selective catalysts for the dehydrogenation of steam-diluted alkanes, cycloalkanes, and arylalkanes can be prepared by highly calcining a support selected from the group consisting of alumina, zinc oxide, HF-treated alumina, silica, magnesia, zirconia, aluminum silicate, and Group II aluminate spinels and mixtures thereof. Of these, the Group II aluminate spinels are particularly effective and excellent results are obtained with zinc aluminate spinel. A catalyst composition is then formed by combining the highly calcined support with a metal selected from the group consisting of nickel, platinum, palladium, ruthenium, iridium, rhodium, osmium, and mixtures thereof. Other catalyst compositions are then formed by combining with this composition a material selected from the group consisting of a Group Ia metal and a tin group metal and mixtures thereof.

The groups of metals referred to herein are as classified in the Periodic Table published in the Chemical Rubber Company's "Handbook of Chemistry and Physics," 45th edition (1964) page B-2.

Aluminate spinels, as referred to herein, are compounds of the formula $M(AlO_2)_2$ or $MO \cdot Al_2O_3$ wherein M is a Group IIa or IIb metal with a valence of 2 such as Zn, Mg, Fe, Be, Ca, and the like.

The highly calcined novel supports of this invention can be prepared by calcining for a sufficient time and at a sufficient temperature an alumina, zinc oxide, HF-treated alumina, silica, magnesia, zirconia, aluminum silicate, or Group II aluminate spinels and mixtures thereof. The spinels of this invention can be prepared be any known method and in one embodiment are prepared by the co-precipitation method wherein appropriate amounts of suitable aluminum compounds and suitable Group II metal compounds are combined under spinel-forming conditions. It is preferred that the proportions of these ingredients be approximately stoichiometric or, alternatively, that the Group II metal compound be up to 10 percent or more in excess of stoichiometric.

According to this invention, the highly calcined support is prepared by calcination for about 1–100 hours at about 1500–2500° F. In another embodiment, a highly calcined support is produced by calcining the support from about 2–50 hours at about 2000–2500° F. and, in a preferred embodiment, the support is highly calcined by heating for about 12 hours at about 2282° F.

The first catalyst composition of this invention can be prepared by combining, in any manner known to the art, certain Group VIII metals, or metal compounds capable of reduction to the metal, including nickel, platinum, ruthenium, palladium, iridium, rhodium, osmium, and mixtures thereof, with the highly calcined support of this invention. Platinum, which is very effective, is preferred. The Group VIII metal content of the catalyst can be in the range of about 0.01–5 weight percent of the support and, in one embodiment, is in the range of 0.1–1 weight percent of the support. Throughout this application the term "weight percent of the support" means parts by weight per 100 parts by weight of support.

Any platinum group metal compound that produces the desired results can be used. In the discussion of the compounds that can be used the platinum compounds will be used as nonlimiting examples. It is to be understood that similar compounds of the other platinum group metals can be used. Examples of simple or noncoordination compounds that can be used are platinic chloride, chloroplatinic acid, ammonium chloroplatinate, and the like. Nonlimiting examples of coordination platinum compounds that can be used are: platinum aminoacetate, platinum dimethyl dioxime, tetrammineplatinum hydroxide, platinum diammine dinitrate, platinum tetraammine dihydroxide, platinum diammine dihydroxide, platinum hexammine dihydroxide, platinum hexammine tetrahydroxide, platinum diammine tetrahydroxide, platinum diammine dihydroxide dinitrate, platinum diammine tetranitrate, platinum diammine dinitrite, platinum tetraammine dicarbonate, platinum diammine oxalate, and the like. Additionally, many complex or coordination divalent and tetravalent platinum compounds are known and can be used.

When added to the support by impregnation from solution, some of the compounds can be added from aqueous solution, but others will require non-aqueous solvents such as alcohols, hydrocarbons, ethers, ketones, and the like.

The second catalyst composition of this invention is prepared by combining a Group Ia metal or metal compound with the components of the first composition with or without a tin group metal. This can be conveniently done by conventional impregnation. The amount of each alkali metal compound or combination of compounds can exist in the range of about 0.01–5 weight percent of the total catalyst; however, in one embodiment, a range of about 0.1–1 weight percent of said support is used. Although any Group Ia metal in compound form is suitable for use in this invention, in one embodiment lithium in lithium nitrate was used. Other convenient compounds are the carbonates, acetates, and hydroxides and the like of sodium, barium, potassium, calcium, and the like.

The third catalyst composition of this invention is prepared by combining a tin group metal including lead, tin and germanium with the components of the first catalyst composition with or without a Group Ia metal. The tin group metal can exist in the range of about 0.01–5 weight percent of said support and, in one embodiment, can exist in the range of about 0.1–1 weight percent of said support. Although any tin group metal in compound form is fully within the scope of this invention, some convenient tin group compounds are the halides, nitrates, oxalates, acetates, carbonates, propionates, tartrates, bromates, chlorates, oxides, hydroxides, and the like of tin, germanium and lead. Tin, itself, is the preferred tin group metal and impregnation of the supports with tin compounds such as the stannous halides is particularly effective and convenient.

Generally speaking, the Group Ia, VIII and tin group compounds, which are combined with the highly calcined supports to form the improved catalysts of the present invention, can be any compound in which all elements, other than those of Group Ia, VIII, the tin group or oxygen, are volatilized during calcination. These compounds can be sequentially combined with the support, in any order, or for convenience, can be applied simultaneously in a single impregnation operation. After impregnation, the composite solids are dried and calcined.

The catalyst systems of this invention are employed at temperatures between 750 and 1250° F., preferably between 1000 to 1100° F., and at total pressures in the range of 0 to 500 p.s.i.g., preferably 0 to 250 p.s.i.g. Steam to hydrocarbon mol ratios of 0.5:1 to 30:1, preferably 2.5:1 to 15:1, are employed. Total space velocity (GHSV) of hydrocarbon and steam is between 100 and 50,000, preferably between 500 and 20,000 volumes of gas/volume of catalyst/hour (32° F., 15 p.s.i. absolute pressure).

The catalysts of the invention are particularly well adapted to the dehydrogenation of alkanes, cycloalkanes, and arylalkanes containing from 2 to 12 carbon atoms. These hydrocarbons include ethane, propane, butane, isobutane, isopentane, heptane, hexanes, octanes, dodecanes, cyclohexane, cyclododecane, cyclopentane, ethylbenzene, n-butylbenzene, and the like, and mixtures thereof. In one embodiment of the invention, n-butane is dehydrogenated to a butene and butadiene-containing product.

During the dehydrogenation operation, the catalyst, which can be in any suitable form such as granules, pills, pellets, spheres, and the like, will slowly lose some activity and will periodically require regeneration by conventional means. This can be conveniently accomplished by cutting off the feed and treating the catalyst with steam-diluted air, such that the oxygen content of the mixture is about 1–2 mol percent. The regeneration treatment can be carried out at temperatures and pressures within the dehydrogenation operating range for about 15 minutes to one hour.

EXAMPLE I

A catalyst support was prepared wherein 7.87 kilograms of hydrated zinc nitrate and 20.455 kilograms of hydrated aluminum nitrate were dissolved in 10 gallons of deionized water. This solution and concentrated ammonia water (28 weight percent $NH_3$) were separately added to 50 gallons of deionized water with stirring over a 1-hour period, the addition rate being adjusted such that the pH was constant at about 7.5. The mixture was stirred 2 additional hours and allowed to stand for 3 days. A precipitate was washed three times by reslurrying in 50 gallons of fresh water, spray dried at about 925° F., dried in an oven about 17 hours at 625° F., formed into ¼-inch pellets, and ground three times. The granules were divided into a number of portions, subjected to various calcination treatments which will be subsequently explained, steamed about 5 hours at about 1025° F. and used in the form of 18–35 mesh granules.

A first portion of these granules was then calcined at 2000° F. for 4 hours and formed into a catalyst composition by contact with sufficient aqueous tetraammine platinum hydroxide solution to impregnate the granules with 0.25 weight percent platinum based on the weight of the granules. Resulting catalyst was dried under a heat lamp, heated to reaction temperature in air, and tested for dehydrogenation ability with an n-butane feed as indicated in Runs 1 and 2 of Table I.

TABLE I

|  | Support calcined at 2,000° F. for 4 hours, 0.25 weight percent platinum | |
|---|---|---|
|  | Run 1 | Run 2 |
| Pressure, p.s.i.g. | 97 | 97 |
| Temperature, °F. | 1,025 | 1,030 |
| Hours on stream | 0.75 | 6.0 |
| GHSV (total) | 1,320 | 1,320 |
| Mols of steam/mols of n-$C_4H_{10}$ | 4.2 | 4.2 |
| Conversion (percent n-$C_4H_{10}$) | 30.3 | 17.6 |
| Distribution of products (at mol percent): |  |  |
| Olefin and diolefin | 96.2 | 97.5 |
| Cracked products and carbon oxides | 3.8 | 2.5 |

These data clearly indicate the operability of the invention and the exceptionally high selectivity characteristics of the catalyst, when the support is calcined for 2000° F. for 4 hours.

EXAMPLE II

Runs were conducted in order to demonstrate the increased selectivity obtained when the highly calcined catalyst of the invention is used in place of a conventional catalyst calcined below the calcination temperatures of this invention. In order to demonstrate the increased selectivity obtained when the catalyst is calcined according to the practice of this invention, a conventional support made in the same manner as in Example I, except calcined at the indicated temperature for the indicated time, was impregnated with platinum and lithium and tested for dehydrogenation with an n-butane stream, the results of which are indicated in Run 1 of Table II. The practice of the invention was then demonstrated by selecting five separate portions of the granular catalyst support of Example I, calcining the support for the indicated time at the indicated temperature, and impregnated with platinum from chloro-platinic acid and lithium from lithium nitrate. The results are indicated in Runs 2, 3, 4, 5, and 6 in Table II.

TABLE II

|  | Run 1 | Run 2 | Run 3 | Run 4 | Run 5 | Run 6 |
|---|---|---|---|---|---|---|
| Calcining temperature, (° F.) | 1,100 | 1,600 | 2,012 | 2,012 | 2,012 | 2,282 |
| Calcining time, hours | 10 | 4 | 5 | 5 | 5 | 12 |
| Percent platinum based on wt. of support | 0.25 | 0.1 | 0.25 | 0.25 | 0.25 | 0.25 |
| Percent lithium based on wt. of support | 0.25 | 0.25 | 0.25 | 0.25 | 0.25 | 0.25 |
| Percent rhodium based on wt. of support |  |  |  |  |  | 0.066 |
| Pressure (p.s.i.g.) | 95 | 95 | 95 | 95 | 95 | 95 |
| Temperature (° F.) | 1,046 | 1,046 | 1,042 | 1,046 | 1,045 | 1,035 |
| Hours on stream | 2.75 | 2.0 | 0.5 | 6.5 | 8.5 | 3.25 |
| GHSV (total) | 1,180 | 1,255 | 1,310 | 1,300 | 1,300 | 1,320 |
| Mols of steam/mol of n-$C_4H_{10}$ | 4.55 | 4.32 | 4.3 | 4.2 | 4.2 | 4.3 |
| Conversion (percent n-$C_4H_{10}$) | 39.6 | 30.5 | 37.1 | 33.1 | 30.5 | 24.9 |
| Distribution of products in mol percent: |  |  |  |  |  |  |
| Olefin and diolefin | 87.0 | 93.0 | 93.5 | 93.7 | 94.0 | 96.3 |
| Cracked products and carbon oxides | 13.0 | 7.0 | 6.5 | 6.3 | 6.0 | 3.7 |

Analysis of the above data clearly indicates that the selectivity for olefin and diolefin is significantly higher when the platinum and lithium are supported on the highly calcined support of the invention (Runs 2 through 6 as opposed to the conventional support of Run 1).

EXAMPLE III

Additional runs were conducted to demonstrate the outstanding catalytic qualities of the catalyst made from a support which was prepared the same as in Example I, except that it was calcined at 2282° F. for 12 hours after which it was impregnated with sufficient chloroplatinic acid, lithium nitrate, and stannous chloride to produce a catalyst composition containing 0.25 weight percent platinum, 0.25 weight percent lithium, and 0.15 weight percent tin based on the weight of the support. This catalyst composition was then tested for dehydrogenation of an n-butane stream at 85 p.s.i.g., at 1035–1045° F., at a GHSV of 7000 (total), and at 4.3/1 to 4.8/1 molar ratio of steam to n-butane. The improved conversion and selectivity as well as the long life of the catalyst is illustrated by the data in the table below which shows the effectiveness of the catalyst over a long period of time and after repeated operation-regeneration cycles with operating periods as long as 24 hours between regenerations. For purposes of comparison, similar data are also shown in the table with a catalyst system which is similar but which does not contain tin and whose zinc aluminate spinel support was not highly calcined.

TABLE III

| Cycle | Total hours | Percent conversion | Percent selectivity [1] |
|---|---|---|---|
| Support calcined at 1100° F. (0.5 wt. percent Pt, 0.5 wt. percent Li) | | | |
| 2 | 8 | 34.7 | 85.7 |
| 6 | 36 | 32.6 | 87.2 |
| 10 | 66 | 33.2 | 87.3 |
| 13 | 85 | 35.6 | 85.8 |
| 22 | 123 | 29.8 | 87.8 |
| 25 | 143 | 21.8 | 89.7 |
|  | 164 | 11.7 | 82.2 |
| 29 | 211 | 33.5 | 84.9 |
|  | 236 | 18.9 | 84.9 |
| 31 | 255 | 35.5 | 83.5 |
|  | 277 | 18.6 | 84.3 |
| Support calcined at 2282° F. (0.25 wt. percent Pt, 0.25 wt. percent Li, 0.15 wt. percent Sn) | | | |
| 4 | 18 | 39.9 | 97.9 |
| 7 | 38 | 41.3 | 97.7 |
| 11 | 105 | 42.1 | 96.9 |
| 15 | 167 | 42.1 | 98.0 |
| 20 | 277 | 40.2 | 97.5 |
|  | 300 | 28.9 | 97.5 |
| 23 | 345 | 40.2 | 97.5 |
|  | 367 | 29.5 | 97.1 |
| 25 | 392 | 41.5 | 96.3 |
|  | 414 | 28.5 | 97.3 |

[1] To butenes and butadiene.

The data in the table above show the high conversions and high selectivity in the invention dehydrogenation process. They further show that the catalyst is extremely long lived, being capable of repeated use and repeated regeneration while still retaining its high effectiveness. Still further, the decrease in activity within a cycle is much more gradual. In general, it is seen that the invention catalyst system and process is a very significant improvement over the prior art processes such as that shown above which does not employ a highly calcined support.

EXAMPLE IV

Several other hydrogenatable hydrocarbons were dehydrogenated using a catalyst and process of the present invention. The catalyst comprised a zinc aluminate spinel support which had been calcined at 1850–2280° F. The highly calcined support was then impregnated with platinum, tin, and lithium to the extent indicated in the table below. The table also contains the essential operating conditions of the tests as well as the results of the tests.

TABLE IV

|  | Isobutane | Isopentane | Heptane |
|---|---|---|---|
| Pt in cat., wt. percent | 0.20 | 0.25 | 0.25 |
| Sn in cat., wt. percent | 0.37 | 0.15 | 0.15 |
| Li in cat., wt. percent | 0 | 0.25 | 0.25 |
| Catalyst age, hours |  | 80 | 108–113 |
| Cycle length, hours | 12 | 6 | 5 |
| Temperature, ° F | 1,100 | 1,050 | 1,000 |
| Pressure, p.s.i.g. | 100 | 100 | 100 |
| Feed rate, GHSV | 1,090 | 1,020 | 1,650 |
| Steam ratio | 7.8 | 10.0 | 4.0 |
| Avg. conversion, percent | 51 | 29 | 11 |
| Selectivity, percent: |  |  |  |
| Olefin | 96 | 81 | 54 |
| Diolefin |  | 11 | 12 |
| Cracked products | 3 | 5 | 12 |
| Carbon oxides | 1.3 | 2 | 2 |
| Aromatics |  |  | 20 |

These data show that the catalyst system of the present invention is also very effective in dehydrogenating other feeds including branched alkanes.

Various modifications of the invention can be made by one reasonably skilled in the art from the disclosure and appended claims.

We claim:

1. A process for dehydrogenating a dehydrogenatable compound of the group alkanes, cycloalkanes, and arylalkanes which comprises contacting at least one compound of said group in admixture with steam and in the absence of free $O_2$ under dehydrogenating conditions with a catalyst composition comprising:
    (a) a support calcined in a temperature range from about 1500–2500° F. for about 1–100 hours so as to become highly calcined, said support selected from the group consisting of Group II aluminum spinels, and mixtures thereof; and
    (b) a Group VIII metal selected from the group consisting of nickel, platinum, palladium, ruthenium, iridium, rhodium, osmium, and mixtures thereof.

2. The process of claim 1 wherein an alkane is dehydrogenated to unsaturated products.

3. The process of claim 2 wherein an alkane is dehydrogenated to an olefin and diolefin containing product.

4. The process of claim 3 wherein n-butane is dehydrogenated to a butene and butadiene containing product.

5. The process of claim 1 wherein said highly calcined support comprises zinc aluminate spinel.

6. The process of claim 5 wherein said zinc aluminate spinel is calcined in a temperature range from about 2000–2500° F. for about 2–50 hours.

7. The process of claim 6 wherein said zinc aluminate spinel is calcined at a temperature of about 2282° F. for about 12 hours.

8. The process of claim 1 wherein said first metal comprises a metal selected from the group consisting of platinum and rhodium and mixtures thereof and is in the range from about 0.01–5 weight percent of said support.

9. The process of claim 8 wherein said metal is in the range of about 0.1–1 weight percent of said support.

10. The process of claim 1 wherein said catalyst composition further comprises a material selected from the group consisting of at least one metal of Group Ia and at least one tin group metal and mixtures thereof.

11. The process of claim 10 wherein said Group Ia metal comprises lithium and is in the range of about 0.01–5 weight percent of said support.

12. The process of claim 11 wherein said lithium is in the range from about 0.1–1 weight percent of said support.

13. The process of claim 10 wherein said tin group metal is selected from the group consisting of tin, germanium, and lead.

14. The process of claim 13 wherein said tin group metal comprises tin and is in the range from about 0.01–5 weight percent of said support.

15. The process of claim 14 wherein said tin is in the range from about 0.1–1 weight percent of said support.

(References on following page)

References Cited

UNITED STATES PATENTS

| | | | |
|---|---|---|---|
| 3,038,865 | 6/1962 | Abrahams | 252—466 |
| 3,113,980 | 12/1963 | Robinson | 260—683 |
| 3,151,180 | 9/1964 | Myers | 260—683.3 |
| 3,429,944 | 2/1969 | Kuchar | 260—683.3 |
| 3,459,657 | 8/1969 | Krönig et al. | 208—143 |
| 3,461,177 | 8/1969 | Box et al. | 260—673.5 |
| 3,461,183 | 8/1969 | Hepp et al. | 260—680 |

PAUL M. COUGHLAN, Jr., Primary Examiner

U.S. Cl. X.R.

252—466 PT; 260—666 A, 673.5, 683.3